United States Patent
Talmor et al.

(10) Patent No.: US 9,420,049 B1
(45) Date of Patent: Aug. 16, 2016

(54) CLIENT SIDE HUMAN USER INDICATOR

(75) Inventors: Ron Talmor, Cupertino, CA (US); Shlomo Yóna, Tel Aviv (IL); Orit Margalit, Tel Aviv (IL); Beni Serfaty, Karkor (IL)

(73) Assignee: F5 Networks, Inc., Seattle, WA (US)

( * ) Notice: Subject to any disclaimer, the term of this patent is extended or adjusted under 35 U.S.C. 154(b) by 578 days.

(21) Appl. No.: 12/828,237

(22) Filed: Jun. 30, 2010

(51) Int. Cl.
*G06F 15/173* (2006.01)
*H04L 29/08* (2006.01)
*G06F 15/16* (2006.01)

(52) U.S. Cl.
CPC .............. *H04L 67/22* (2013.01); *H04L 67/02* (2013.01)

(58) Field of Classification Search
CPC ................................ H04L 67/22; H04L 67/02
USPC ......................................... 709/203, 229, 224
See application file for complete search history.

(56) References Cited

U.S. PATENT DOCUMENTS

| | | |
|---|---|---|
| 5,282,201 A | 1/1994 | Frank et al. |
| 5,550,816 A | 8/1996 | Hardwick et al. |
| 5,606,665 A | 2/1997 | Yang et al. |
| 5,623,490 A | 4/1997 | Richter et al. |
| 5,991,302 A | 11/1999 | Berl et al. |
| 5,995,491 A | 11/1999 | Richter et al. |
| 6,026,500 A | 2/2000 | Topff et al. |
| 6,029,175 A | 2/2000 | Chow et al. |
| 6,041,365 A | 3/2000 | Kleinerman |
| 6,047,356 A | 4/2000 | Anderson et al. |
| 6,067,558 A | 5/2000 | Wendt et al. |
| 6,104,706 A | 8/2000 | Richter et al. |
| 6,154,777 A | 11/2000 | Ebrahim |
| 6,157,950 A | 12/2000 | Krishnan |
| 6,259,405 B1 | 7/2001 | Stewart et al. |
| 6,260,070 B1 | 7/2001 | Shah |
| 6,292,832 B1 | 9/2001 | Shah et al. |
| 6,304,913 B1 | 10/2001 | Rune |
| 6,330,574 B1 | 12/2001 | Murashita |
| 6,338,082 B1 | 1/2002 | Schneider |
| 6,353,848 B1 | 3/2002 | Morris |
| 6,363,056 B1 | 3/2002 | Beigi et al. |
| 6,370,527 B1 | 4/2002 | Singhal |

(Continued)

FOREIGN PATENT DOCUMENTS

| | | |
|---|---|---|
| CA | 2080530 A1 | 4/1994 |
| EP | 0605088 A3 | 7/1994 |

(Continued)

OTHER PUBLICATIONS

Baer, T., et al., "The elements of Web Services" ADTmag.com, Dec. 1, 2002, pp. 1-6, (http://www.adtmag.com).

(Continued)

*Primary Examiner* — Hee Soo Kim
(74) *Attorney, Agent, or Firm* — LeClairRyan, a Professional Corporation

(57) ABSTRACT

A system and method for preventing web scraping which includes receiving a request between a web client and a web server for the web client to receive web content. A client side language script is injected into a response to be sent to the requesting web client, wherein the client side language script contains an event listener to detect a keystroke and/or a mouse movement at the web client. Information is collected from the client side language script relating to whether the keystroke and/or the mouse movement were detected. The web client is selectively allowed to access the web server to receive the web content based on the collected information.

24 Claims, 3 Drawing Sheets

(56) References Cited

U.S. PATENT DOCUMENTS

| | | | |
|---|---|---|---|
| 6,389,462 | B1 | 5/2002 | Cohen et al. |
| 6,446,108 | B1 | 9/2002 | Rosenberg et al. |
| 6,466,580 | B1 | 10/2002 | Leung |
| 6,469,983 | B2 | 10/2002 | Narayana et al. |
| 6,513,061 | B1 | 1/2003 | Ebata et al. |
| 6,514,085 | B2 | 2/2003 | Slattery et al. |
| 6,542,936 | B1 | 4/2003 | Mayle et al. |
| 6,560,230 | B1 | 5/2003 | Li et al. |
| 6,578,069 | B1 | 6/2003 | Hopmann et al. |
| 6,615,267 | B1 | 9/2003 | Whalen et al. |
| 6,631,422 | B1 | 10/2003 | Althaus et al. |
| 6,654,346 | B1 | 11/2003 | Mahalingaiah et al. |
| 6,701,415 | B1 | 3/2004 | Hendren, III |
| 6,708,220 | B1 | 3/2004 | Olin |
| 6,728,704 | B2 | 4/2004 | Mao et al. |
| 6,738,357 | B1 | 5/2004 | Richter et al. |
| 6,744,776 | B1 | 6/2004 | Kalkunte et al. |
| 6,754,215 | B1 | 6/2004 | Arikawa et al. |
| 6,754,699 | B2 | 6/2004 | Swildens et al. |
| 6,760,337 | B1 | 7/2004 | Snyder, II et al. |
| 6,795,860 | B1 | 9/2004 | Shah |
| 6,857,009 | B1 | 2/2005 | Ferreria |
| 6,862,282 | B1 | 3/2005 | Oden |
| 6,865,593 | B1 | 3/2005 | Reshef et al. |
| 6,868,447 | B1 | 3/2005 | Slaughter et al. |
| 6,871,221 | B1 | 3/2005 | Styles |
| 6,880,017 | B1 | 4/2005 | Marce et al. |
| 6,883,137 | B1 | 4/2005 | Girardot et al. |
| 6,904,040 | B2 | 6/2005 | Salapura et al. |
| 6,914,881 | B1 | 7/2005 | Mansfield et al. |
| 6,928,518 | B2 | 8/2005 | Talagala |
| 6,970,475 | B1 | 11/2005 | Fraser et al. |
| 6,970,924 | B1 | 11/2005 | Chu et al. |
| 6,973,490 | B1 | 12/2005 | Robertson et al. |
| 6,975,592 | B1 | 12/2005 | Seddigh et al. |
| 6,990,074 | B2 | 1/2006 | Wan et al. |
| 6,990,114 | B1 | 1/2006 | Erimli et al. |
| 7,003,564 | B2 | 2/2006 | Greuel et al. |
| 7,006,502 | B2 | 2/2006 | Lin |
| 7,020,713 | B1 | 3/2006 | Shah et al. |
| 7,023,974 | B1 | 4/2006 | Brannam et al. |
| 7,035,212 | B1 | 4/2006 | Mittal et al. |
| 7,039,061 | B2 | 5/2006 | Connor et al. |
| 7,065,482 | B2 | 6/2006 | Shorey et al. |
| 7,075,924 | B2 | 7/2006 | Richter et al. |
| 7,076,689 | B2 | 7/2006 | Atkinson |
| 7,080,314 | B1 | 7/2006 | Garofalakis et al. |
| 7,089,491 | B2 | 8/2006 | Feinberg et al. |
| 7,113,996 | B2 | 9/2006 | Kronenberg |
| 7,133,863 | B2 | 11/2006 | Teng et al. |
| 7,155,722 | B1 | 12/2006 | Hilla et al. |
| 7,161,904 | B2 | 1/2007 | Hussain et al. |
| 7,191,163 | B2 | 3/2007 | Herrera et al. |
| 7,228,359 | B1 | 6/2007 | Monteiro |
| 7,236,491 | B2 | 6/2007 | Tsao et al. |
| 7,240,100 | B1 | 7/2007 | Wein et al. |
| 7,257,633 | B2 | 8/2007 | Masputra et al. |
| 7,292,541 | B1 | 11/2007 | C S |
| 7,296,263 | B1 | 11/2007 | Jacob |
| 7,308,475 | B1 | 12/2007 | Pruitt et al. |
| 7,324,533 | B1 | 1/2008 | DeLiberato et al. |
| 7,340,571 | B2 | 3/2008 | Saze |
| 7,373,438 | B1 | 5/2008 | DeBergalis et al. |
| 7,409,440 | B1 | 8/2008 | Jacob |
| 7,555,608 | B2 | 6/2009 | Naik et al. |
| 7,577,723 | B2 | 8/2009 | Matsuda et al. |
| 7,640,347 | B1 | 12/2009 | Sloat et al. |
| 7,684,423 | B2 | 3/2010 | Tripathi et al. |
| 7,698,458 | B1 | 4/2010 | Liu et al. |
| 7,822,839 | B1 | 10/2010 | Pruitt et al. |
| 7,861,085 | B1 | 12/2010 | Case et al. |
| 7,895,653 | B2 * | 2/2011 | Calo et al. .................. 726/23 |
| 7,903,554 | B1 | 3/2011 | Manur et al. |
| 7,908,245 | B2 | 3/2011 | Nakano et al. |
| 7,958,222 | B1 | 6/2011 | Pruitt et al. |
| 7,984,500 | B1 * | 7/2011 | Khanna et al. ................. 726/22 |
| 8,024,443 | B1 | 9/2011 | Jacob |
| 8,037,528 | B2 | 10/2011 | Williams et al. |
| 8,064,342 | B2 | 11/2011 | Badger |
| 8,155,128 | B2 | 4/2012 | Balyan et al. |
| 8,171,124 | B2 | 5/2012 | Kondamuru |
| 8,190,769 | B1 | 5/2012 | Shukla et al. |
| 8,271,620 | B2 | 9/2012 | Witchey |
| 8,396,836 | B1 | 3/2013 | Ferguson et al. |
| 8,463,850 | B1 | 6/2013 | McCann |
| 8,484,348 | B2 | 7/2013 | Subramanian et al. |
| 8,838,817 | B1 | 9/2014 | Biswas |
| 8,879,431 | B2 | 11/2014 | Ridel et al. |
| 8,959,215 | B2 | 2/2015 | Koponen et al. |
| 9,143,451 | B2 | 9/2015 | Amdahl et al. |
| 2001/0007560 | A1 | 7/2001 | Masuda et al. |
| 2002/0010757 | A1 | 1/2002 | Granik et al. |
| 2002/0012352 | A1 | 1/2002 | Hansson et al. |
| 2002/0032758 | A1 | 3/2002 | Yen et al. |
| 2002/0038360 | A1 | 3/2002 | Andrews et al. |
| 2002/0065848 | A1 | 5/2002 | Walker et al. |
| 2002/0072048 | A1 | 6/2002 | Slattery et al. |
| 2002/0087571 | A1 | 7/2002 | Stapel et al. |
| 2002/0087744 | A1 | 7/2002 | Kitchin |
| 2002/0099829 | A1 | 7/2002 | Richards et al. |
| 2002/0103823 | A1 | 8/2002 | Jackson et al. |
| 2002/0143819 | A1 | 10/2002 | Han et al. |
| 2002/0162118 | A1 | 10/2002 | Levy et al. |
| 2002/0174216 | A1 | 11/2002 | Shorey et al. |
| 2002/0194112 | A1 | 12/2002 | dePinto et al. |
| 2002/0194342 | A1 | 12/2002 | Lu et al. |
| 2002/0198956 | A1 | 12/2002 | Dunshea et al. |
| 2003/0005172 | A1 | 1/2003 | Chessell |
| 2003/0009528 | A1 | 1/2003 | Sharif et al. |
| 2003/0018450 | A1 | 1/2003 | Carley |
| 2003/0018585 | A1 | 1/2003 | Butler et al. |
| 2003/0018927 | A1 | 1/2003 | Gadir et al. |
| 2003/0034905 | A1 | 2/2003 | Anton et al. |
| 2003/0046335 | A1 | 3/2003 | Doyle et al. |
| 2003/0051045 | A1 | 3/2003 | Connor |
| 2003/0055723 | A1 | 3/2003 | English |
| 2003/0074301 | A1 | 4/2003 | Solomon |
| 2003/0105846 | A1 | 6/2003 | Zhao et al. |
| 2003/0128708 | A1 | 7/2003 | Inoue et al. |
| 2003/0130945 | A1 | 7/2003 | Force et al. |
| 2003/0139934 | A1 | 7/2003 | Mandera |
| 2003/0156586 | A1 | 8/2003 | Lee et al. |
| 2003/0179755 | A1 | 9/2003 | Fraser |
| 2003/0189936 | A1 | 10/2003 | Terrell et al. |
| 2003/0191812 | A1 | 10/2003 | Agarwalla et al. |
| 2003/0195813 | A1 | 10/2003 | Pallister et al. |
| 2003/0212954 | A1 | 11/2003 | Patrudu |
| 2003/0220835 | A1 | 11/2003 | Barnes, Jr. |
| 2003/0229665 | A1 | 12/2003 | Ryman |
| 2003/0236995 | A1 | 12/2003 | Fretwell, Jr. |
| 2004/0006591 | A1 | 1/2004 | Matsui et al. |
| 2004/0015783 | A1 | 1/2004 | Lennon et al. |
| 2004/0017825 | A1 | 1/2004 | Stanwood et al. |
| 2004/0030627 | A1 | 2/2004 | Sedukhin |
| 2004/0030740 | A1 | 2/2004 | Stelting |
| 2004/0043758 | A1 | 3/2004 | Sorvari et al. |
| 2004/0059789 | A1 | 3/2004 | Shum |
| 2004/0064544 | A1 | 4/2004 | Barsness et al. |
| 2004/0064554 | A1 | 4/2004 | Kuno et al. |
| 2004/0093361 | A1 | 5/2004 | Therrien et al. |
| 2004/0103206 | A1 | 5/2004 | Hsu et al. |
| 2004/0122926 | A1 | 6/2004 | Moore et al. |
| 2004/0123277 | A1 | 6/2004 | Schrader et al. |
| 2004/0133605 | A1 | 7/2004 | Chang et al. |
| 2004/0138858 | A1 | 7/2004 | Carley |
| 2004/0167967 | A1 | 8/2004 | Bastian et al. |
| 2004/0177165 | A1 | 9/2004 | Masputra et al. |
| 2004/0213156 | A1 | 10/2004 | Smallwood et al. |
| 2004/0215665 | A1 | 10/2004 | Edgar et al. |
| 2004/0236826 | A1 | 11/2004 | Harville et al. |
| 2004/0260745 | A1 | 12/2004 | Gage et al. |
| 2005/0008017 | A1 | 1/2005 | Datta et al. |
| 2005/0021703 | A1 | 1/2005 | Cherry et al. |
| 2005/0027841 | A1 | 2/2005 | Rolfe |

(56) References Cited

U.S. PATENT DOCUMENTS

| | | |
|---|---|---|
| 2005/0044158 A1 | 2/2005 | Malik |
| 2005/0117589 A1 | 6/2005 | Douady et al. |
| 2005/0165656 A1 | 7/2005 | Frederick et al. |
| 2005/0174944 A1 | 8/2005 | Legault et al. |
| 2005/0175013 A1 | 8/2005 | Le Pennec et al. |
| 2005/0198234 A1 | 9/2005 | Leib et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0246393 A1 | 11/2005 | Coates et al. |
| 2005/0256806 A1 | 11/2005 | Tien et al. |
| 2006/0031374 A1 | 2/2006 | Lu et al. |
| 2006/0031778 A1 | 2/2006 | Goodwin et al. |
| 2006/0045089 A1 | 3/2006 | Bacher et al. |
| 2006/0045096 A1 | 3/2006 | Farmer et al. |
| 2006/0047785 A1 | 3/2006 | Wang et al. |
| 2006/0100752 A1 | 5/2006 | Kim et al. |
| 2006/0112367 A1 | 5/2006 | Harris |
| 2006/0123210 A1 | 6/2006 | Pritchett et al. |
| 2006/0133374 A1 | 6/2006 | Sekiguchi |
| 2006/0140193 A1 | 6/2006 | Kakani et al. |
| 2006/0153201 A1 | 7/2006 | Hepper et al. |
| 2006/0209669 A1 | 9/2006 | Nishio |
| 2006/0229861 A1 | 10/2006 | Tatsuoka et al. |
| 2006/0235998 A1 | 10/2006 | Stecher et al. |
| 2006/0259320 A1 | 11/2006 | LaSalle et al. |
| 2006/0268692 A1 | 11/2006 | Wright et al. |
| 2006/0270341 A1 | 11/2006 | Kim et al. |
| 2006/0282442 A1 | 12/2006 | Lennon et al. |
| 2007/0005807 A1 | 1/2007 | Wong |
| 2007/0016613 A1 | 1/2007 | Foresti et al. |
| 2007/0019636 A1 | 1/2007 | Lau et al. |
| 2007/0038994 A1 | 2/2007 | Davis et al. |
| 2007/0067373 A1 | 3/2007 | Higgins et al. |
| 2007/0067771 A1 | 3/2007 | Kulbak et al. |
| 2007/0112775 A1 | 5/2007 | Ackerman |
| 2007/0124415 A1 | 5/2007 | Lev-Ran et al. |
| 2007/0124502 A1 | 5/2007 | Li |
| 2007/0130255 A1 | 6/2007 | Wolovitz et al. |
| 2007/0147246 A1 | 6/2007 | Hurley et al. |
| 2007/0162891 A1 | 7/2007 | Burner et al. |
| 2007/0168320 A1 | 7/2007 | Borthakur et al. |
| 2007/0168525 A1 | 7/2007 | DeLeon et al. |
| 2007/0192543 A1 | 8/2007 | Naik et al. |
| 2007/0233826 A1 | 10/2007 | Tindal et al. |
| 2008/0004022 A1 | 1/2008 | Johannesson et al. |
| 2008/0010372 A1 | 1/2008 | Khedouri et al. |
| 2008/0022059 A1 | 1/2008 | Zimmerer et al. |
| 2008/0120592 A1 | 5/2008 | Tanguay et al. |
| 2008/0141246 A1 | 6/2008 | Kuck et al. |
| 2008/0208917 A1 | 8/2008 | Smoot et al. |
| 2008/0263401 A1 | 10/2008 | Stenzel |
| 2008/0270578 A1 | 10/2008 | Zhang et al. |
| 2008/0281908 A1 | 11/2008 | McCanne et al. |
| 2008/0281944 A1 | 11/2008 | Vorne et al. |
| 2009/0080440 A1 | 3/2009 | Balyan et al. |
| 2009/0089487 A1 | 4/2009 | Kwon et al. |
| 2009/0094311 A1* | 4/2009 | Awadallah et al. ........... 709/202 |
| 2009/0097480 A1 | 4/2009 | Curtis et al. |
| 2009/0106413 A1* | 4/2009 | Salo et al. .................... 709/224 |
| 2009/0125955 A1 | 5/2009 | DeLorme |
| 2009/0138314 A1 | 5/2009 | Bruce |
| 2009/0144285 A1 | 6/2009 | Chatley et al. |
| 2009/0161542 A1 | 6/2009 | Ho |
| 2009/0187915 A1 | 7/2009 | Chew et al. |
| 2009/0217386 A1* | 8/2009 | Schneider ...................... 726/30 |
| 2009/0248870 A1 | 10/2009 | Kamei et al. |
| 2009/0265396 A1 | 10/2009 | Ram et al. |
| 2009/0265467 A1 | 10/2009 | Peles |
| 2009/0289828 A1 | 11/2009 | Hinchey |
| 2009/0292957 A1 | 11/2009 | Bower et al. |
| 2009/0300161 A1 | 12/2009 | Pruitt et al. |
| 2009/0316708 A1 | 12/2009 | Yahyaoui et al. |
| 2009/0319600 A1 | 12/2009 | Sedan et al. |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0093318 A1 | 4/2010 | Zhu et al. |
| 2010/0103820 A1 | 4/2010 | Fuller et al. |
| 2010/0179984 A1 | 7/2010 | Sebastian |
| 2010/0228814 A1 | 9/2010 | McKenna et al. |
| 2010/0228819 A1 | 9/2010 | Wei |
| 2010/0242092 A1* | 9/2010 | Harris et al. ...................... 726/3 |
| 2010/0250497 A1 | 9/2010 | Redlich et al. |
| 2010/0251329 A1* | 9/2010 | Wei .................................. 726/1 |
| 2010/0261479 A1 | 10/2010 | Hidaka |
| 2010/0274772 A1 | 10/2010 | Samuels |
| 2010/0306169 A1 | 12/2010 | Pishevar et al. |
| 2011/0055921 A1* | 3/2011 | Narayanaswamy et al. .... 726/22 |
| 2011/0066736 A1 | 3/2011 | Mitchell et al. |
| 2011/0072321 A1 | 3/2011 | Dhuse |
| 2011/0075667 A1 | 3/2011 | Li et al. |
| 2011/0078303 A1 | 3/2011 | Li et al. |
| 2011/0098087 A1 | 4/2011 | Tseng |
| 2011/0113095 A1 | 5/2011 | Hatami-Hanza |
| 2011/0153985 A1 | 6/2011 | Saha et al. |
| 2011/0185082 A1 | 7/2011 | Thompson |
| 2011/0188415 A1 | 8/2011 | Graziano |
| 2011/0213911 A1 | 9/2011 | Eldus et al. |
| 2012/0094631 A1 | 4/2012 | Pattabiraman |
| 2012/0102011 A1 | 4/2012 | Matsuki et al. |
| 2012/0117028 A1 | 5/2012 | Gold et al. |
| 2012/0150805 A1 | 6/2012 | Pafumi et al. |
| 2012/0195273 A1 | 8/2012 | Iwamura et al. |
| 2012/0254293 A1 | 10/2012 | Winter et al. |
| 2012/0257506 A1 | 10/2012 | Bazlamacci et al. |
| 2012/0258766 A1 | 10/2012 | Cho et al. |
| 2013/0058229 A1 | 3/2013 | Casado et al. |
| 2013/0073717 A1 | 3/2013 | Collin et al. |
| 2013/0114497 A1 | 5/2013 | Zhang et al. |
| 2013/0182713 A1 | 7/2013 | Giacomoni et al. |
| 2013/0238472 A1 | 9/2013 | Fan et al. |
| 2014/0071895 A1 | 3/2014 | Bane et al. |
| 2014/0099945 A1 | 4/2014 | Singh et al. |
| 2014/0105069 A1 | 4/2014 | Potnuru |
| 2014/0187199 A1 | 7/2014 | Yan et al. |
| 2014/0286316 A1 | 9/2014 | Park et al. |
| 2015/0058595 A1 | 2/2015 | Gura et al. |

FOREIGN PATENT DOCUMENTS

| | | |
|---|---|---|
| EP | 1081918 A2 | 3/2001 |
| JP | 06-205006 | 7/1994 |
| JP | 8021924 B | 3/1996 |
| JP | 2000183935 | 6/2000 |
| WO | 00/58870 A2 | 10/2000 |
| WO | 02/39696 A2 | 5/2002 |
| WO | 2006/091040 A1 | 8/2006 |

OTHER PUBLICATIONS

Blue Coat, "Technology Primer: CIFS Protocol Optimization," Blue Coat Systems Inc., pp. 1-3, (http://www.bluecoat.com).

"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).

F5 Networks Inc., "Big-IP® Reference Guide, version 4.5", F5 Networks Inc., Sep. 2002, pp. 11-1-11-32, Seattle, Washington.

F5 Networks Inc., "3-DNS® Reference Guide, version 4.5", F5 Networks Inc., Sep. 2002, pp. 2-1-2-28, 3-1-3-12, 5-1-5-24, Seattle, Washington.

F5 Networks Inc., "Using F5's-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).

F5 Networks Inc., "Deploying the BIG-IP LTM for Diameter Load Balancing," F5® Deployment Guide, Version 2.0, pp. 1-19.

F5 Networks Inc., "F5 Diameter RM", Powerpoint document, Jul. 16, 2009, pp. 1-7.

F5 Networks Inc., "Routing Global Internet Users to the Appropriate Data Center and Applications Using F5's 3-DNS Controller", F5

(56) References Cited

OTHER PUBLICATIONS

Networks Inc., Aug. 2001, pp. 1-4, Seattle, Washington, (http://www.f5.com/f5producs/3dns/relatedMaterials/UsingF5.html).

F5 Networks Inc., "Case Information Log for 'Issues with BoNY upgrade to 4.3'", as early as Feb. 2008.

F5 Networks Inc., "F5 WANJet CIFS Acceleration", White Paper, F5 Networks Inc., Mar. 2006, pp. 1-5, Seattle, Washington.

Fajardo V., "Open Diameter Software Architecture," Jun. 25, 2004, last accessed Sep. 2, 2008, pp. 1-6, Version 1.0.7, (http://diameter.sourceforge.net/diameter-architecture/indext.html).

Gupta et al., "Algorithms for packet classification", Dept. of Comput. Scie., Stanford Univ., CA, Mar./Apr. 2001, , pp. 1, vol. 15, Issue 2, abstract only, last accessed May 14, 2007 (http://ieeexplore.ieee.org/xpl/freeabs_all.jsp?arnumber=912717&isnumber=19697).

Heinz G., "Priorities in Stream Transmission Control Protocol (SCTP) Multistreaming", Thesis submitted to the Faculty of the University of Delaware, Spring 2003, pp. 1-35.

Ilvesjmaki M., et al., "On the capabilities of application level traffic measurements to differentiate and classify Internet traffic", Presented in SPIE's International Symposium ITcom, Aug. 19-21, 2001, pp. 1-11, Denver, Colorado.

Internet Protocol,"Darpa Internet Program Protocol Specification", (RFC:791), Information Sciences Institute, University of Southern California, Sep. 1981, pp. 1-49.

Kawamoto, D., "Amazon files for Web services patent", CNET News.com, Jul. 28, 2005, pp. 1-2, last accessed May 4, 2006, (http://news.com).

LaMonica M., "Infravio spiffs up Web services registry idea", CNET News.com, May 11, 2004, pp. 1-2, last accessed Sep. 20, 2004, (http://www.news.com).

Mac Vittie, L., "Message-Based Load Balancing: Using F5 solutions to address the challenges of scaling Diameter, Radius, and message-oriented protocols", F5 Technical Brief, 2005, pp. 1-9, F5 Networks Inc., Seattle, Washington.

"Market Research & Releases, CMPP PoC documentation", last accessed Mar. 29, 2010, (http://mainstreet/sites/PD/Teams/ProdMgmt/MarketResearch/Universal).

"Market Research & Releases, Solstice Diameter Requirements", last accessed Mar. 29, 2010, (http://mainstreet/sites/PD/Teams/ProdMgmt/MarketResearch/Unisversal).

Modiano E., "Scheduling algorithms for message transmission over a satellitebroadcast system", MILCOM 97 Proceedings Lincoln Lab., MIT, Nov. 2-5, 1997, abstract only, last accessed Sep. 12, 2008, (http://ieeexplore,ieee.org/xpl/freeabs)all.jsp?arnumber=646697).

Nichols K., et al., "Definition of the Differentiated Services Field (DS Field) in the IPv4 and IPv6 Headers", (RFC:2474) Network Working Group, Dec. 1998, pp. 1-19, last accessed Oct. 8, 2012, (http://www.ietf.org/rfc/rfc2474.txt).

Ott D., et al., "A Mechanism for TCP-Friendly Transport-level Protocol Coordination", USENIX Annual Technical Conference, 2002, University of North Carolina at Chapel Hill, pp. 1-12.

Padmanabhan V., et al., "Using Predictive Prefetching to Improve World Wide Web Latency", SIGCOM, 1996, pp. 1-15.

"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).

Rosen E., et al., "MPLS Label Stack Encoding", (RFC:3032) Network Working Group, Jan. 2001, pp. 1-22, last accessed Oct. 8, 2012, (http://www.ietf.org/rfc/rfc3032.txt).

Schilit B., "Bootstrapping Location-Enhanced Web Services", University of Washington, Dec. 4, 2003, (http://www.cs.washington.edu/news/colloq.info.html).

Seeley R., "Can Infravio technology revive UDDI?", ADTmag.com, Oct. 22, 2003, last accessed Sep. 30, 2004, (http://www.adtmag.com).

Shohoud, Y., "Building XML Web Services with VB .Net and VB 6", Addison Wesley, 2002, pp. 1-14.

Sommers F., "Whats New in UDDI 3.0—Part 1", Web Services Papers, Jan. 27, 2003, pp. 1-4, last accessed Mar. 31, 2004, (http://www.webservices.org/index.php/article/articleprint/871/-1/24/).

Sommers F., "Whats New in UDDI 3.0—Part 2", Web Services Papers, Mar. 2, 2003, pp. 1-8, last accessed Nov. 1, 2007, (http://www.web.archive.org/web/20040620131006/).

Sommers F., "Whats New in UDDI 3.0—Part 3", Web Services Papers, Sep. 2, 2003, pp. 1-4, last accessed Mar. 31, 2007, (http://www.webservices.org/index.php/article/articleprint/894/-1/24/).

Sleeper B., "The Evolution of UDDI: UDDI.org White Paper", The Stencil Group, Inc., Jul. 19, 2002, pp. 1-15, San Francisco, California.

Sleeper B., "Why UDDI Will Succeed, Quietly: Two Factors Push Web Services Forward", The Stencil Group, Inc., Apr. 2001, pp. 1-7, San Francisco, California.

"UDDI Overview", Sep. 6, 2000, pp. 1-21, uddi.org, (http://www.uddi.org/).

"UDDI Version 3.0.1 UDDI Spec Technical Committee Specification", Oct. 14, 2003, pp. 1-383, uddi.org, (http://www.uddi.org/).

"UDDI Technical White Paper," Sep. 6, 2000, pp. 1-12, uddi-org, (http://www.uddi.org/).

Wang B., "Priority and realtime data transfer over the best-effort Internet", Dissertation Abstract, 2005, ScholarWorks@UMASS.

Wikipedia, "Diameter (protocol)", pp. 1-11, last accessed Oct. 27, 2010, (http://en.wikipedia.org/wiki/Diameter_(protocol)).

Woo T.Y.C., "A modular approach to packet classification: algorithms and results", Nineteenth Annual Conference of the IEEE Computer and Communications Societies 3(3):1213-22, Mar. 26-30, 2000, abstract only, last accessed May 14, 2007, (http://ieeexplore.ieee.org/xpl/freeabs_all.jsp?arnumber=832499).

\* cited by examiner

CLIENT SIDE HUMAN USER INDICATOR

TECHNOLOGICAL FIELD

This technology generally relates to network communication security, and more particularly, to prevent web scraping.

BACKGROUND

With the widespread use of web-based applications, and the Internet in general, concerns have been raised with the security of such servers and web applications operating on them in view of the array of bots and other web scraping potential malicious requests. Various security measures have been taken to combat these ever growing threats, including implementing web application firewalls ("WAFs"), such as the BIG-IP Application Security Manager™ ("ASM™") product developed by F5 Networks, Inc., of Seattle, Wash., which may be used to analyze network traffic to Web application servers for identifying and filtering out malicious packets or to otherwise thwart malicious attacks.

Web scraping is a computer software technique of extracting information from web pages in which web scrapers, search engines or bots index web content and transforms unstructured Web content, typically in HTML format, into structured data that can be stored and analyzed in a central local database or spreadsheet. Although safeguards against web scraping exist, such as CAPTCHA, bots and other web scrapers have become more complex and able to bypass these safeguards to take content off of web pages.

SUMMARY

In an aspect, a method for preventing web scraping comprises receiving a request between a web client and a web server for the web client to receive web content. The method comprises injecting a client side language script into a response to be sent to the requesting web client, wherein the client side language script contains an event listener to detect a keystroke and/or a mouse movement at the web client. The method comprises collecting information from the client side language script relating to whether the keystroke and/or the mouse movement were detected. The method comprises selectively allowing the web client to access the web server to receive the web content based on the collected information.

In an aspect, a machine readable medium having stored thereon instructions for preventing web scraping, comprising machine executable code which when executed by at least one machine, causes the machine to receive a request between a web client and a web server for the web client to receive web content. The code causes the machine to inject a client side language script into a response to be sent to the requesting web client, wherein the client side language script contains an event listener to detect a keystroke and/or a mouse movement at the web client. The code causes the machine to collect information from the client side language script relating to whether the keystroke and/or the mouse movement were detected. The code causes the machine to selectively allow the web client to access the web server to receive the web content based on the collected information.

In an aspect, a network traffic manager for preventing web scraping, the network traffic manager comprises a server interface coupled to a server and a network interface coupled to a web client via a network. The network interface receives a request from the web client requesting access to the server. A controller is coupled to the server interface and the network interface. The controller is operative to inject a client side language script into a response to be sent to the requesting web client, wherein the client side language script contains an event listener to detect a keystroke and/or a mouse movement at the web client. The controller collects information from the client side language script relating to whether the keystroke and/or the mouse movement were detected. The controller selectively allows the web client to access the web server to receive the web content based on the collected information.

DETAILED DESCRIPTION

Figure 1:
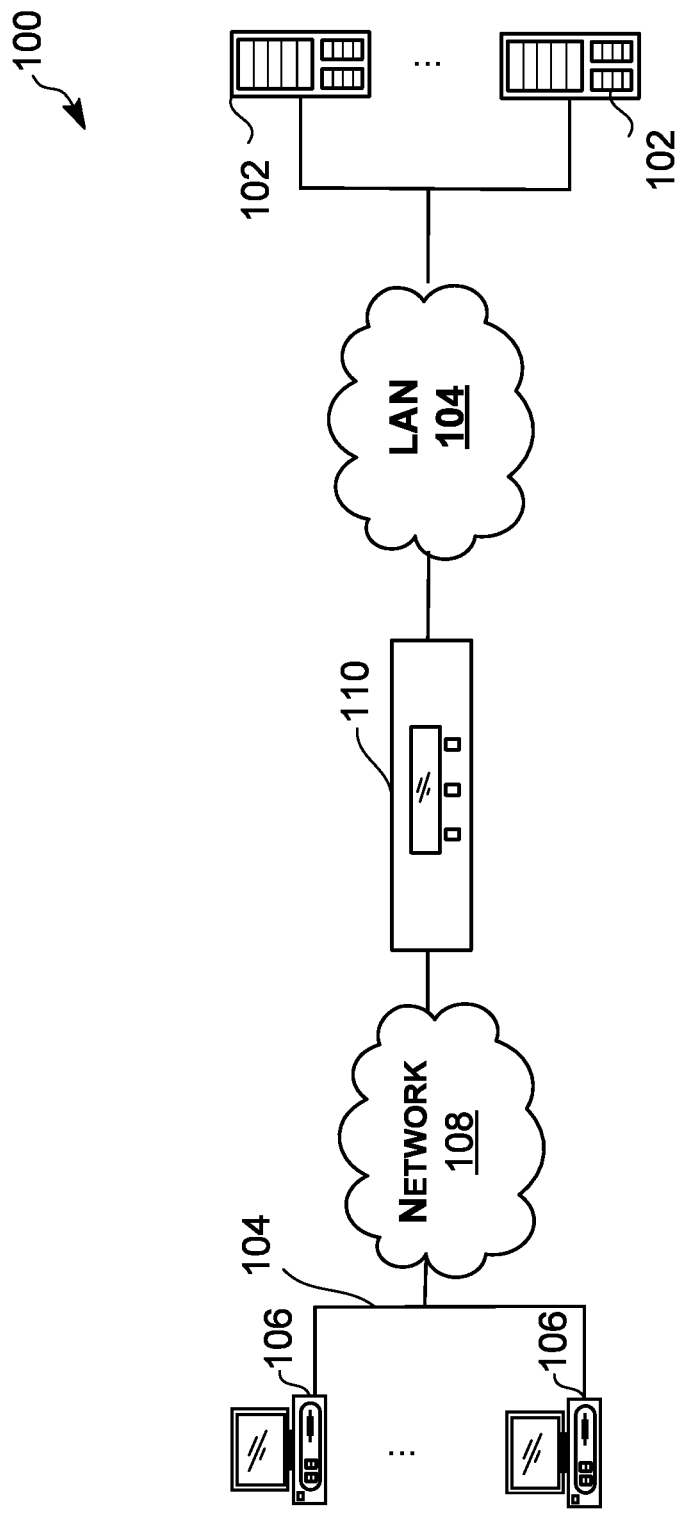
FIG. 1 is a diagram of an example system environment that includes a network traffic manager configured to identify and diffuse network attacks.

Referring now to FIG. 1, an example system environment 100 employs a network traffic management device 110 that is capable of identifying and selectively thwarting unauthorized bots, web scrapers or other malicious content scraping entities from capturing web content. The example system environment 100 includes one or more Web application servers 102, one or more client devices 106 and the traffic management device 110, although the environment 100 could include other numbers and types of devices in other arrangements. The network traffic management device 110 is coupled to the web application servers 102 via local area network (LAN) 104 and client devices 106 via network 108. Generally, requests sent over the network 108 from client devices 106 towards Web application servers 102 are received by traffic management device 110.

Client devices 106 comprise computing devices capable of connecting to other computing devices, such as network traffic management device 110 and Web application servers 102. Such connections are performed over wired and/or wireless networks, such as network 108, to send and receive data, such as for Web-based requests, receiving responses to requests and/or performing other tasks, in accordance with the processes described below in connection with FIG. 3. Non-limiting and non-exhausting examples of such devices include personal computers (e.g., desktops, laptops), mobile and/or smart phones and the like. In an example, client devices 106 run Web browsers that may provide an interface for operators, such as human users, to interact with for making requests for resources to different web server-based applications or Web pages via the network 108, although other server resources may be requested by clients. One or more Web-based applications may run on the web application server 102 that provide the requested data back to one or more exterior network devices, such as client devices 106.

Network 108 comprises a publicly accessible network, such as the Internet, which includes client devices 106. However, it is contemplated that the network 108 may comprise other types of private and public networks that include other devices. Communications, such as requests from clients 106 and responses from servers 102, take place over the network 108 according to standard network protocols, such as the HTTP and TCP/IP protocols in this example. However, the principles discussed herein are not limited to this example and can include other protocols. Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 108 includes any communication method by which data may travel between client devices 106, Web application servers 102 and network traffic management device 110, and the like.

LAN 104 comprises a private local area network that includes the network traffic management device 110 coupled to the one or more servers 102, although the LAN 104 may comprise other types of private and public networks with other devices. Networks, including local area networks, besides being understood by those skilled in the relevant arts, have already been generally described above in connection with network 108 and thus will not be described further.

Web application server 102 comprises one or more server computing machines capable of operating one or more Web-based applications that may be accessed by network devices in the network 108. Such network devices include client devices 106, via the network traffic management device 110, and may provide other data representing requested resources, such as particular Web page(s), image(s) of physical objects, and any other objects, responsive to the requests. It should be noted that the server 102 may perform other tasks and provide other types of resources. It should be noted that while only two Web application servers 102 are shown in the environment 100 depicted in FIG. 1, other numbers and types of servers may be coupled to the network traffic management device 110. It is also contemplated that one or more of the Web application servers 102 may be a cluster of servers managed by the network traffic management device 110.

As per the TCP/IP protocols, requests from the requesting client devices 106 may be sent as one or more streams of data packets over network 108 to the network traffic management device 110 and/or the Web application servers 102. Such protocols can establish connections, send and receive data for existing connections, and the like. It is to be understood that the one or more Web application servers 102 may be hardware and/or software, and/or may represent a system with multiple servers that may include internal or external networks. In this example, the Web application servers 102 may be any version of Microsoft® IIS servers or Apache® servers, although other types of servers may be used. Further, additional servers may be coupled to the network 108 and many different types of applications may be available on servers coupled to the network 108.

Each of the Web application servers 102 and client devices 106 may include one or more central processing units (CPUs), one or more computer readable media (i.e., memory), and interface systems that are coupled together by internal buses or other links as are generally known to those of ordinary skill in the art.

As shown in the example environment 100 depicted in FIG. 1, the network traffic management device 110 is interposed between client devices 106 in network 108 and Web application servers 102 in LAN 104. Again, the environment 100 could be arranged in other manners with other numbers and types of devices. Also, the network traffic management device 110 is coupled to network 108 by one or more network communication links and intermediate network devices (e.g. routers, switches, gateways, hubs and the like) (not shown). It should be understood that the devices and the particular configuration shown in FIG. 1 are provided for exemplary purposes only and thus are not limiting.

Generally, the network traffic management device 110 manages network communications, which may include one or more client requests and server responses, from/to the network 108 between the client devices 106 and one or more of the Web application servers 102 in LAN 104. These requests may be destined for one or more servers 102, and may take the form of one or more TCP/IP data packets originating from the network 108. The requests pass through one or more intermediate network devices and/or intermediate networks, until they ultimately reach the traffic management device 110. In any case, the network traffic management device 110 may manage the network communications by performing several network traffic related functions involving the communications. Such functions include load balancing, access control, and validating HTTP requests using JavaScript code that are sent back to requesting client devices 106 in accordance with the processes described further below in connection with FIG. 3.

Figure 2:
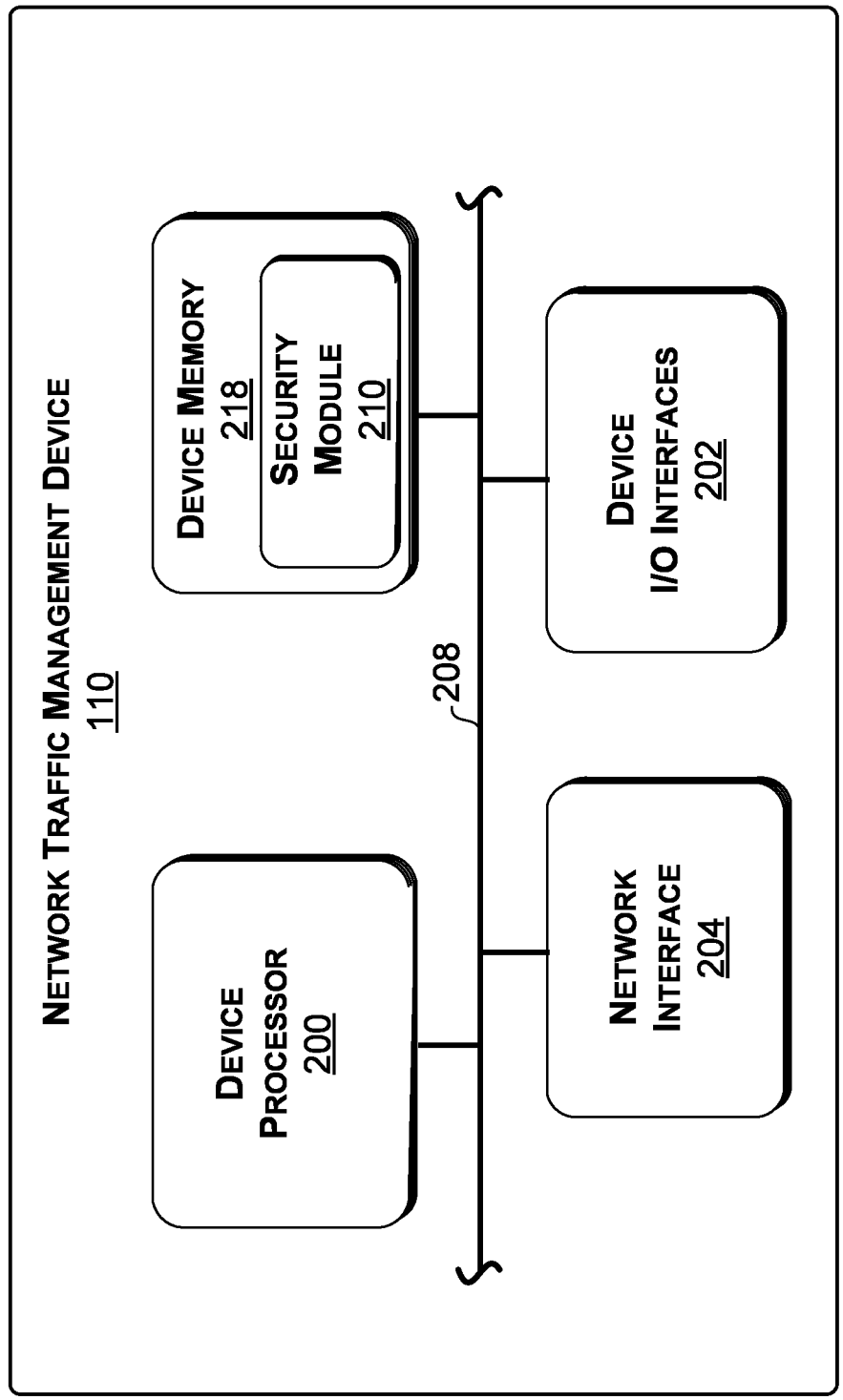
FIG. 2 is a block diagram of the network traffic manager shown in FIG. 1.

Referring now to FIG. 2, an example network traffic management device 110 includes a device processor 200, device I/O interfaces 202, network interface 204 and device memory 218, which are coupled together by bus 208. It should be noted that the device 110 could include other types and numbers of components.

Device processor 200 comprises one or more microprocessors configured to execute computer/machine readable and executable instructions stored in device memory 218. Such instructions implement network traffic management related functions of the network traffic management device 110. In addition, the instructions implement the security module 210 to perform one or more portions of the processes illustrated in FIG. 3 for protecting the system. It is understood that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor is programmed or configured according to the teachings as described and illustrated herein with respect to FIG. 3.

Device I/O interfaces 202 comprise one or more user input and output device interface mechanisms. The interface may include a computer keyboard, mouse, display device, and the corresponding physical ports and underlying supporting hardware and software to enable the network traffic management device 110 to communicate with the outside environment. Such communication may include accepting user data input and to provide user output, although other types and numbers of user input and output devices may be used. Additionally or alternatively, as will be described in connection with network interface 204 below, the network traffic management device 110 may communicate with the outside environment for certain types of operations (e.g., configuration) via a network management port.

Network interface 204 comprises one or more mechanisms that enable network traffic management device 110 to engage in TCP/IP communications over LAN 104 and network 108. However, it is contemplated that the network interface 204 may be constructed for use with other communication protocols and types of networks. Network interface 204 is sometimes referred to as a transceiver, transceiving device, or network interface card (NIC), which transmits and receives network data packets to one or more networks, such as LAN 104 and network 108. In an example where the network traffic management device 110 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the network traffic management device 110 with other network devices, such as Web application servers 102. Moreover, the interface 204 may include certain physical ports dedicated to receiving and/or transmitting certain types of network data, such as device management related data for configuring the network traffic management device 110.

Bus 208 may comprise one or more internal device component communication buses, links, bridges and supporting components, such as bus controllers and/or arbiters. The bus enable the various components of the network traffic management device 110, such as the processor 200, device I/O interfaces 202, network interface 204, and device memory 218, to communicate with one another. However, it is contemplated that the bus may enable one or more components of the network traffic management device 110 to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the network traffic management device 110.

Device memory 218 comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media contains computer readable/machine-executable instructions, data structures, program modules, or other data, which may be obtained and/or executed by one or more processors, such as device processor 200. Such instructions allow the processor to perform actions, including implementing an operating system for controlling the general operation of network traffic management device 110 to manage network traffic and implementing security module 210 to perform one or more portions of the process illustrated in FIG. 3.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information. Such desired information includes data and/or computer/machine-executable instructions and which can be accessed by a computing or specially programmed device, such as network traffic management device 110.

Security module 210 is depicted in FIG. 2 as being within memory 218 for exemplary purposes only; it should be appreciated the module 210 may be alternatively located elsewhere. Generally, when instructions embodying the security module 210 are executed by the device processor 200, the network traffic management device 110 identifies and diffuses potential or suspected network attacks on the server 102 by placing additional burdens on the suspected attacking client devices 106. The security module 210 identifies network communications that may include network attacks, or at least suspected network attacks, using information obtained by the security module 210 to analyze collected data regarding particular clients, such as client devices 106, client requests destined for particular servers, such as the server 102, or particular resources made available by particular servers that have been requested, for example.

In addition to preventing web scrapers and other types of bots from accessing one or more servers 102, the security module 210 may use additional information obtained by further analyzing collected data to identify latencies associated with particular servers, server applications or other server resources, page traversal rates, client device fingerprints and access statistics that the security module 210 may analyze to identify anomalies indicative to the module 210 that there may be an attack. The security module 210 also analyzes collected data to obtain information the security module 210 may use to identify particular servers and/or server applications and resources on particular servers, such as Web application server 102, being targeted in network attacks, so the module 210 can handle the attack.

Although an example of the Web application server 102, network traffic device 110, and client devices 106 are described and illustrated herein in connection with FIGS. 1 and 2, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

Furthermore, each of the devices of the system 100 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like. The devices may be programmed according to the teachings as described and illustrated herein, as will be appreciated by those skilled in the computer, software, and networking arts.

In addition, two or more computing systems or devices may be substituted for any one of the devices in the system 100. Accordingly, principles and advantages of distributed processing, such as redundancy, replication, and the like, also can be implemented, as desired, to increase the robustness and performance of the devices and systems of the system 100. The system 100 may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

The security module 210 of the network traffic management device performs a two step process to mitigate web scraping by a web crawler, bot or other web content collecting entity. In an aspect, the security module 210 subjects the web client to one or more computational challenges, to determine if the web client 106 is Javascript Proper. However, it is contemplated that a computational challenge is not sent to the web client (e.g. when the security module is not in blocking mode.) To be Javascript proper, the web client 106 has to support Javascript, and support cookies, as well as be able to provide satisfactory results to the computational challenges from the security module 210 of the network traffic management device 110.

In particular, the challenge preferably includes information representing instructions (e.g., JavaScript code) to be executed by the web client 106 to perform the challenge. The challenge preferably includes instructions to generate an HTTP cookie for storing any result(s) obtained by performing the challenge as well as recreate and resend its initial request including any cookies that store the challenge results. Although the challenge preferably includes Javascript code, other types of challenges can be employed and the code could be expressed in other programming, markup or script languages. For example, the challenge may be to compute some code and then auto-submit a form, which contains the original request, enveloped in the modified response which is sent back to the web client 106. The challenge is sent to the web client 106 in a modified response on behalf of the potentially targeted server. The web client 106 thus receives what it would otherwise understand to be a response, from the server, to its initial request.

If the web client 106 is indeed not JavaScript proper, then it would not be able to execute the challenge or, alternatively be able to execute the challenge but not generate the correct result. However, if the web client is indeed JavaScript proper, the web client 106 will execute the challenge and resend its initial request along with results obtained by executing the challenge in a cookie. It is contemplated that other fingerprints or information may be utilized which that the security module 210 will be able to analyze to determine that the associated requestor is legitimate. It should be noted that regardless of whether the bot and/or webscraper is able to correctly solve and update the challenge, the actual time it takes the client to go through the challenge cycle, including computing the challenge, results in the bot/web scraper being slowed down in obtaining information.

The security module 210 in the network traffic management device 110 confirms whether the received challenge results are correct to determine whether the web client 106 is JavaScript proper. The calculation of such a challenge allows a legitimate requestor to access server resources without any interference while non-Javascript proper web crawlers are filtered out. The security module 210 therefore gains some control over the rate of requests to the server 102. It is to be understood that other client side languages such as FLASH, Silverlight, VB script, etc. may be returned with the request.

In an aspect, the system may send several computational challenges to the web client to make it difficult for a bot or web scraper to copy the computational challenges from a previous intervals to bypass the current challenge. The computational challenge may require the web client to locate a special challenge cookie placed by the security module 210 when the request is sent back to the web client. However, it is contemplated that other types and/or techniques of administering a computational challenge can be utilized.

The system also proactively protects the web application by extending the scope of its data collection in the web client by injecting a client side script into HTTP responses with HTML content. In an aspect, the client side script is a JavaScript enabled technique called a client side human user indicator (CSHUI) code which is effectively used to determine whether the web client is being operated by a human by monitoring one or more keyboard and/or mouse events over a set amount of time and/or within a time period. It is preferred that the CSHUI code is inserted into the HTTP response after the computational challenge has been successfully validated by the web client. However it is contemplated that the validation of the web client may be performed before and/or after the CSHUI code has been injected into the response.

The CSHUI code is configured to hook into and log keyboard and/or mouse events, whereby the CSHUI code causes the web client to send a CSHUI cookie which carries human activity (or an indicated of lack of human activity) information to the web server to allow determination of whether the web client is operated by a human or a bot. However, it is contemplated that the web client may send this information back in another manner instead of using a cookie. For example, it is contemplated that the human activity information (or lack thereof) may be communicated from the web client using a parameter such as a query string or post; a specialized Ajax request, a special header or any other appropriate means.

The security module 210, when implementing the CSHUI code in a web client, first sends a CSHUI code snippet to the web client, preferably in an obfuscated manner known in the art. The CSHUI code snippet, once executed on the client side, causes the web client to download, preferably in a delayed manner, the actual CSHUI code. The delayed code download has advantages as the code will be downloaded from the network traffic management device 110 to the web client only if the web client was able to previously execute the code snippet. Additionally, bandwidth usage is reduced and latency is minimized in viewing the web content since most or all of other Javascript code will have first been loaded before the CSHUI code is loaded. Further, for delayed code loading, this facilitates caching mechanisms in the client side in intermediate proxies as well as the network traffic management device 110.

In particular, the CSHUI code utilizes an event listener which is configured to monitor activity in the web client while the web client displays a HTML page. In particular, the event listener of the CSHUI code determines whether keyboard and/or mouse activity has been detected and then updates a flag value in the CSHUI cookie if the event listener has detected sufficient mouse and/or keyboard activity in a session. In an aspect, the CSHUI cookie will have a unique identifier and a flag value of whether human activity has been detected (e.g. flag set to true). The security module 210 keeps track of the CSHUI cookies sent from the web client and monitors whether at least one cookie has had its flag be set to true within a predetermined number of transactions received from the web client. The security module 210 may be configured to keep these scores within a session and store them in a message key which effectively allows the approved web client to continue to receive the web content from the web server for that session for a set number of safe intervals. For example, a human user accessing a web page having a continuously updating stock ticker may not move the mouse or press a key on the keyboard throughout the session. However, if at any point during the session, the CSHUI detects keyboard and/or mouse movement (thus, concluding that a human is operating the web client), the security module 210 will continue allowing web content from the web server to be sent to the web client.

In an aspect, the network traffic management device 110 uses a CSHUI_ID to protect the cookie from theft in a valid session, whereby the CSHUI ID is injected along with the CSHUI cookie for each validation cycle (described below). In an aspect, network traffic management device 110 keeps the CSHUI_ID current per interval and considers the web client as being operated by a human only if it has human indication (CSHUI cookie value true) and the CSHUI_ID is current for that interval.

The system may be configured to store and utilize a white-list of approved web scrapers, bots, search engines or other content accessing entities in which the Web server will provide the web content to the web client even though non-human activity has been detected. In an embodiment, the entities are identified on the white-list by IP Address, by User Agents, by user credentials' identification, by connection, by session, and the like. It should be stressed that if requests are being issued to the web application server by an entity which can be associated with the white list, then the requests are approved and are not further monitored for web scraping violations. In other words, the system and method does not perform web scraping detection when the requesting web client is on the white-list. Thus, if a web crawler or bot is identified by the CSHUI cookie, but is on the white-list, the Web server will continue to provide web content to the Web client. Additionally or alternatively, the system may be configured to store and utilize a black-list of non-approved web scrapers, bots, search engines or other content accessing entities. In particular, the system can check whether the requesting entity is on the black-list and automatically refuse access to that entity of it is on the black-list. In an embodiment, the entities are identified on the white-list by IP Address, User Agents, by user credentials' identification, by connection, by session, and the like although web page addresses or other identifying information is contemplated for use with the black-list.

It is contemplated that the network traffic management device 110 can store the identity (e.g. IP address, subnet mask, web page address) or other information (e.g. user-agent string) of the web crawler or bot for diagnostic purposes, policy building, and/or preventative measures. This information can be also used for optimization of the web scraping mitigation feature of the system.

Figure 3:
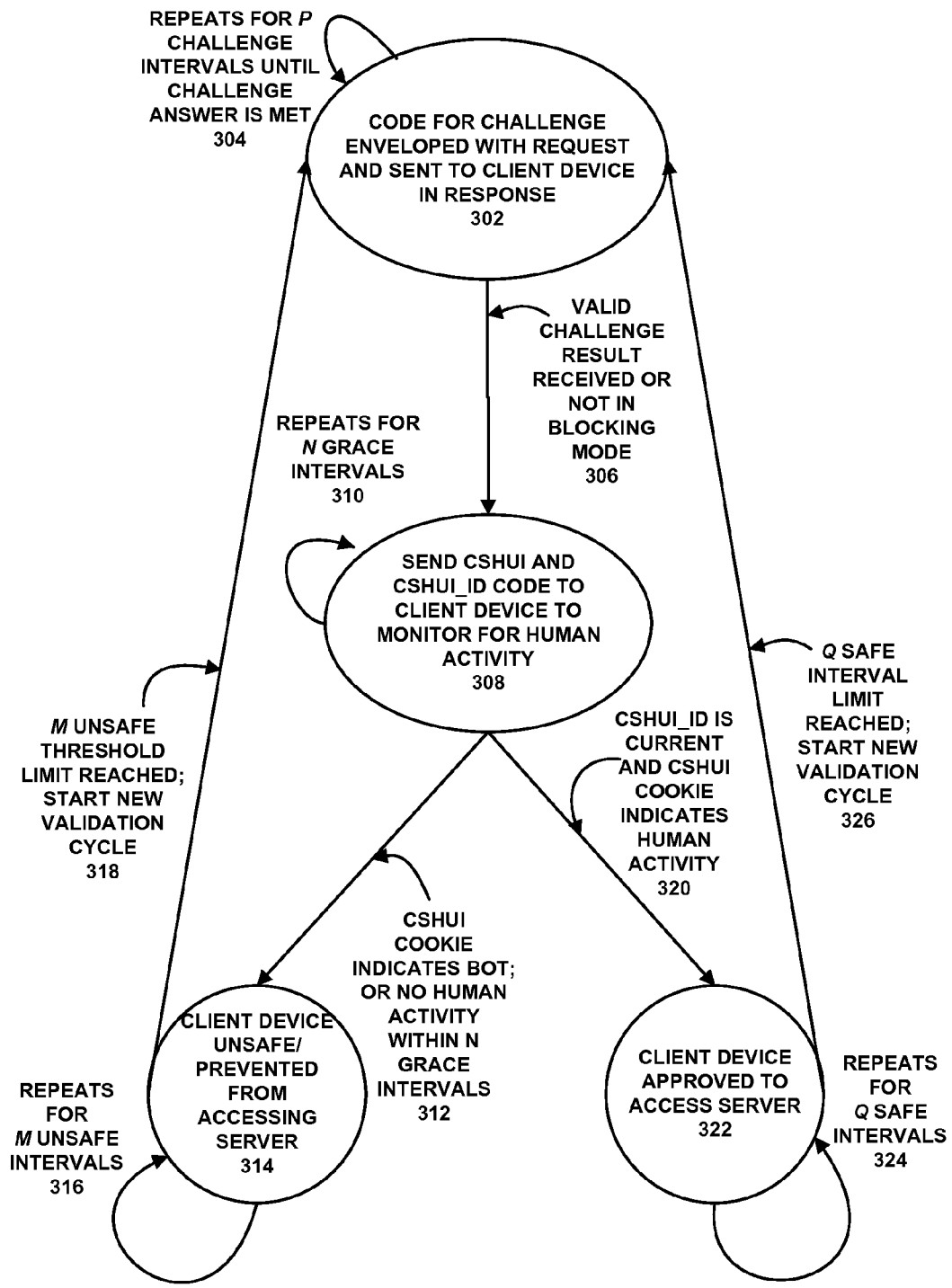
FIG. 3 is an example flow chart diagram depicting portions of processes for preventing web scraping; and While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

The operation of the example use of the web scraping mitigation technique is shown in FIG. 3 which may be run on the example network traffic management device 110, described with reference to FIGS. 1-2. FIG. 3 is a flow diagram of a process performed by the network traffic management device 110 in accordance with an aspect of the present disclosure. As described above, an HTTP request is intercepted by the network traffic management device 110 from a web client running a web browser (e.g. Firefox™, Internet Explorer™, Safari™, Chrome™). However, as stated above, the network traffic management device 110, and in particular the security device 210, performs all or part of the process in FIG. 3 to monitor these requests and prevent them from reaching the server if the requests are determined to originate from a web crawler, potential bot, search engine or other unauthorized web scraping entity.

As shown in FIG. 3, upon a request being received by the network traffic management device 110, a new validation cycle is started. As stated above, the network traffic management device 110 will accordingly respond to initial incoming requests depending on whether the security module 210 is operating in a blocking mode or a non-blocking mode. If the security module 210 is operating in a non-blocking mode, the process proceeds directly to block 308, as shown by arrow 306, in which the network traffic management device 110 assigns a CSHUI_ID and injects a CSHUI code into responses from the server as described below. In the non-blocking mode, the security module 210 allows requests to proceed to the server 102. However, the security module 210 will issue an alarm notification and declare the validation cycle as unsafe if the request is later determined to be received from a web scraping entity.

However, if the security module 210 is already operating in the blocking mode, upon receiving the request, a response will be sent with the original request enveloped in it along with JavaScript code that causes the browser on the client device to execute a computational challenge. Once the browser provides a result to the computational challenge, the client device 106 will auto submit the original request along with the result of the challenge (in a cookie) back to the Web application server 102. The security module 210 intercepts the request sent from the client device and inspects the result of the computational challenge. If the security module 210 determines that the result is proper and correct, then the security module 210 will forward the request to the web application server 102 for that client device and will move on to the next state (block 308 in FIG. 3). It should be noted that detection of page traversals as well as hidden link functionality described below may be incorporated within and/or between blocks 302 and 308 in FIG. 3.

However, if no answer or a wrong answer to the challenge is intercepted by the network traffic management device 110, the device 110 will again send a modified response with another enveloped computational challenge to the web client 106. As shown by arrow 304, this challenge process will repeat for P number of times until a proper answer is received by the network traffic management device 110, whereby P may be set to a set finite number of intervals or an indefinite number of intervals.

However, if a proper answer to the computational challenge is intercepted by the network traffic management device 110 within a threshold limit of P intervals (if applicable), the process proceeds to block 308, as indicated by arrow 306. At block 308, the security module 210 of the network traffic management device 110 assigns a CSHUI_ID for the session and injects a CSHUI code into responses from the server which are sent to the client device 106. As stated above, a CSHUI cookie corresponding to the injected CSHUI code is stored on the client device 106, whereby the CSHUI code monitors mouse and/or keyboard actions on the client device 106 and updates one or more values in the CSHUI cookie to indicate whether a human is operating the client device 106. The modified value in the CSHUI cookie is provided in subsequent requests from the client device 106 which are then inspected by the security module 210.

As indicated by arrow 312, if the CSHUI cookie comes back to the network traffic management device 110 with a value which indicates that the requests are coming from a bot or web scraper, (shown as arrow 312) the security module considers the validation cycle as unsafe and goes into the prevent mode (block 314). If the security module 210 was previously operating in the blocking mode, then all further requests (up to the M number of unsafe intervals) are blocked from being passed on through to the server 102. However, if the security module 210 was previously in the non-blocking mode, the request is allowed to pass through onto server but the security module 210 produces an alarm notification for a M number of unsafe intervals, as described below.

However, as stated above, it is possible that the request received by the security module may not even include a CSHUI cookie value. It is also possible that the request may include a CSHUI cookie whose value is unchanged. In either case, as shown by arrow 310, the security module 210 is configured to repeat the step at block 308 for a N number of grace intervals, as indicated by arrow 310. In particular, the security module 210 will allow a limited number of subsequent requests to be passed on to the server 102 even though the CSHUI cookie does not definitively indicate whether the client device 106 is being operated by a human or a bot. The threshold of a maximum number of grace intervals to be allowed per session can be set to a desired value N on the network traffic management device 110. However, as shown by arrow 312, if the number of requests exceeds the threshold limit N of grace intervals while the security module 210 is in the blocking mode, then the security module 210 refuses the request from going to the server and (prevent mode), as shown in block 314. Then the security module 210 moves to an unsafe/prevented stated (block 314).

In block 314, it should be noted that the security module 210, in its blocking mode, will run a counter which keeps track of a number of requests received from the client device 106 which are refused to pass on to the server ("unsafe intervals"). However, if the security module 210 is operating in its non-blocking mode, it will allow requests to proceed to the server, and will issue alarm notifications for every request within an unsafe interval, as shown by arrow 316. If the number of refused requests reaches or exceeds the set threshold limit of M number of unsafe intervals, then the validation cycle starts over and the process begins at block 302, as shown by arrow 318.

Referring back to block 308, if the security module 210 finds that the CSHUI cookie has a modified value that indicates heuristics that a human is operating the client device 106 (e.g. keystrokes and/or mouse movements detected), the security module 210 will also inspect the CSHUI_ID present in the request. In particular, the security module 210 will determine whether the received CSHUI cookie has a CSHUI_ID matches the CSHUI_ID for that particular session, as shown by arrow 320. If both of these conditions are satisfied, the security module 210 will conclude that the client device 106 is not a bot, and switches to an approval mode for the client device 106, whereby subsequent requests from the client device 106 will be allow to access the server for that session (block 322). It should be noted that if the web client is identified to be one of the approved entities on a white-list, then the process described in FIG. 3 is not performed on the web client 106.

It should be noted that the security module 210, in its approval mode, will run a counter which keeps track of a subsequent Q number of requests received from the client device 106 which are allowed to pass on to the server (referred to herein as "safe intervals"). As shown by arrow 324, if the number of subsequent allowed requests exceed the set threshold limit of Q safe intervals, then the validation cycle starts over, and the process begins again at block 302, as shown by arrow 326.

It should be noted that although the security module 210 in the network traffic management device is described herein as sending the computational challenges and processing the CSHUI code/cookies, it is contemplated that the web application or web server which serves the web application can be configured to perform these duties.

Additionally or alternatively, it is possible for the network traffic management device 110 to monitor the number of page traversals (e.g. load, unload and/or refresh requests) which are received from a particular web client over a predetermined amount of time to determine whether the web client is human or a web scraper. In an example, the predetermined number of allowed page traversals per a time unit is set in the network traffic management device 110 by an administrator, wherein the setting may be a value that permits no more than 5 page traversals per second. If the network traffic management device 110 detects that more than 5 page traversals have occurred within a second (or less), then the network traffic management device 110 may consider the web client as hostile and drop the connection or may refer to the authorized list in the policy enforcer. This is based on the assumption that a human will not make such a high number of requests within that small period of time. It should be noted that although a value of more than 5 page traversals per second is discussed above, any other value greater or lesser than 5 is contemplated. It should be noted that keyboard and mouse movement and usage can be used as a heuristics for detecting a human user on the client side while the network traffic management device is detecting whether too many page traversals occur per time unit (e.g. identifying the requesting pattern as a "non human activity").

It is also contemplated that network traffic management device randomizes and adds a hidden link to web pages where the CSHUI script is injected into the response. The hidden link cannot be viewed by a human, unless page markup and code is carefully inspected, although it will be able to be selected by a bot or web scraper. As a result, if the hidden link is selected, the CSHUI cookie will be set to false and the network traffic management device will conclude that the web client is hostile. Additionally or alternatively to the page traversal feature described above, keyboard and mouse movement and usage can be used as a heuristics for detecting a human user on the client side while and the hidden link functionality is performed to determine whether the client device is being operated by a human or a bot.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
   receiving, by a network traffic manager device, a request from a web client device to receive web content from a web server device;
   placing, by the network traffic manager device, a client side language script into a response to the request received from the web server device and to be sent to the web client device, wherein the client side language script comprises an event listener to detect human activity at the web client device and an access flag to indicate when the web client device is granted access to the web server device;
   receiving, by the network traffic manager device, collected information from the client side language script;
   analyzing, by the network traffic management computing device, the collected information to determine when an indicator of human activity associated with the web client device are detected; and
   sending, by the network traffic manager device, a subsequent received request to the web server device and setting the access flag to indicate that the web client device is granted access to the web server device for a predetermined number of subsequent received requests from the web client device upon determining from the analyzed collected information that the indicator of human activity associated with the web client device was detected.

2. The method of claim 1, further comprising:
applying, by the network traffic manager device, a computational challenge in the request and sending the request back to the web client device prior to the placement of the client side language script; and
receiving, by the network traffic manager device, a reply to the computational challenge from the web client device, wherein the placement of the client side language script occurs when the reply to the computational challenge indicates that the web client device supports JavaScript.

3. The method of claim 1, further comprising:
granting, by the network traffic manager device, access to the web server device and receives web content when the indicator of human activity at the web client device is detected in a session or when the web client device is on an authorized list.

4. The method of claim 1, further comprising:
assigning, by the network traffic manager device, a session identification for the web client device when placing the client language script into the response sent to the web client device, wherein the web client device is granted access to the web server device when the collected information matches the session identification.

5. The method of claim 1, further comprising:
preventing, by the network traffic manager device, the web client device from accessing the web server device for the predetermined number of transactions upon determining from the analyzed collected information that the indicator of human activity associated with the web client device was not detected.

6. The method of claim 1, further comprising:
monitoring, by the network traffic manager device, a number of page traversals received from the web client device over a predetermined period of time, to determine when the web client device is operated by a human.

7. The method of claim 1, further comprising:
inserting, by the network traffic manager device, a web page link not viewable by a human to determine when the web client device is not operated by a human.

8. The method of claim 1, wherein a subsequent request does not include collected information from the client side language script, and further comprising:
sending, by the network traffic manager device, the client side language script in individual responses to the web client device for a predetermined number of grace intervals.

9. A non-transitory computer readable medium having stored thereon instructions for preventing web scraping, comprising machine executable code which when executed by at least one processor, causes the processor to perform steps rising:
receiving a request from a web client device to receive web content from a web server device;
placing a client side language script into a response to the request received from the web server device and to be sent to the web client device, wherein the client side language script comprises an event listener to detect human activity at the web client device and an access flag to indicate when the web client device is granted access to the web server device;
receiving collected information from the client side language script;
analyzing the collected information to determine when an indicator of human activity associated with the web client device are detected; and
sending a subsequent received request to the web server device and setting the access flag to indicate that the web client device is granted access to the web server device for a predetermined number of subsequent received requests from the web client device upon determining from the analyzed collected information that the indicator of human activity associated with the web client device was detected.

10. The medium of claim 9, further having stored thereon instructions that when executed by the processor cause the processor to perform steps further comprising:
applying a computational challenge in the request and sending the request back to the web client device prior to the placement of the client side language script; and
receiving a reply to the computational challenge from the web client device, wherein the placement of the client side language script occurs when the reply to the computational challenge indicates that the web client device supports JavaScript.

11. The medium of claim 9, further having stored thereon instructions that when executed by the processor cause the processor to perform steps further comprising:
granting access to the web server device and receives web content when human activity at the web client device is detected in a session or when the web client device is on an authorized list.

12. The medium of claim 9, further having stored thereon instructions that when executed by the processor cause the processor to perform steps further comprising:
assigning a session identification for the web client device when placing the client language script into the response sent to the web client device, wherein the web client device is granted access to the web server device when the collected information matches the session identification.

13. The medium of claim 9, further having stored thereon instructions that when executed by the processor cause the processor to perform steps further comprising:
preventing the web client device from accessing the web server device for the predetermined number of transactions upon determining from the analyzed collected information that the indicator of human activity associated with the web client device was not detected.

14. A network traffic manager device comprising:
one or more processors;
a memory coupled to the one or more processors which are configured to be capable of executing programmed instructions comprising and stored in the memory to:
receive a request from a web client device to receive web content from a web server device;
place a client side language script into a response to the request received from the web server device and to be sent to the web client device, wherein the client side language script comprises an event listener to detect human activity at the web client device and an access flag to indicate when the web client device is granted access to the web server device;
receive collected information from the client side language script;
analyzing the collected information to determine when an indicator of human activity associated with the web client device are detected; and
send a subsequent received request to the web server device and set the access flag to indicate that the web client device is granted access to the web server device for a predetermined number of subsequent received requests from the web client device upon determining from the analyzed collected information that the indicator of human activity associated with the web client device was detected.

15. The network traffic manager device of claim 14, wherein the processor is further configured to be capable of executing programmed instructions comprising and stored in the memory to:
grant access to the web server device and receives web content when a keystroke or mouse movement is detected or when the web client device is on an authorized list.

16. The network traffic manager device of claim 14, wherein the processor is further configured to be capable of executing programmed instructions comprising and stored in the memory to:
place a computational challenge in the request and send the request back to the web client device prior to the placement of the client side language script; and
receive a reply to the computational challenge from the web client device, wherein the placement of the client side language script occurs when the reply to the computational challenge indicates that the web client device supports JavaScript.

17. The network traffic manager device of claim 14, wherein the processor is further configured to be capable of executing programmed instructions comprising and stored in the memory to:
assign a session identification for the web client device when placing the client language script into the response sent to the web client device, wherein the web client device is granted access to the web server device when the collected information matches the session identification.

18. The network traffic manager device of claim 14, wherein the processor is further configured to be capable of executing programmed instructions comprising and stored in the memory to:
prevent the web client device from accessing the web server device for a predetermined number of unsafe intervals upon determining from the analyzed collected information that the indicator of human activity associated with the web client device was not detected.

19. The network traffic manager device of claim 14, wherein the processor is further configured to be capable of executing programmed instructions comprising and stored in the memory to:
monitor a number of page traversals received from the web client device over a predetermined period of time, to determine when the web client device is operated by a human.

20. The network traffic manager device of claim 14, wherein the processor is further configured to be capable of executing programmed instructions comprising and stored in the memory to:
insert a web page link not viewable by a human to determine when the web client device is not operated by a human.

21. The network traffic manager device of claim 14, wherein the subsequent request does not include collected information from the client side language script, and wherein the processor is further configured to be capable of executing programmed instructions comprising and stored in the memory to:
send client side language script in individual responses to the web client device for a predetermined number of grace intervals.

22. The medium of claim 9, further having stored thereon instructions that when executed by the processor cause the processor to perform steps further comprising:
monitoring a number of page traversals received from the web client device over a predetermined period of time, to determine when the web client device is operated by a human.

23. The medium of claim 9, further having stored thereon instructions that when executed by the processor cause the processor to perform steps further comprising:
inserting a web page link not viewable by a human to determine when the web client device is not operated by a human.

24. The medium of claim 9, wherein the subsequent request does not include collected information from the client side language script, and further having stored thereon instructions that when executed by the processor cause the processor to perform steps further comprising:
sending client side language script in individual responses to the web client device for a predetermined number of grace intervals.

* * * * *